G. H. MARTIN.
ANTISKID DEVICE.
APPLICATION FILED OCT. 17, 1916.
1,231,181.
Patented June 26, 1917.
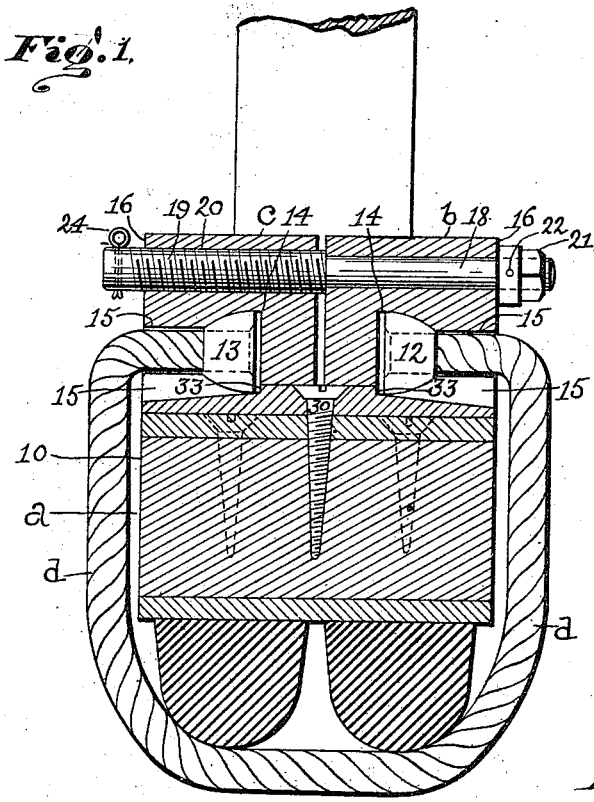
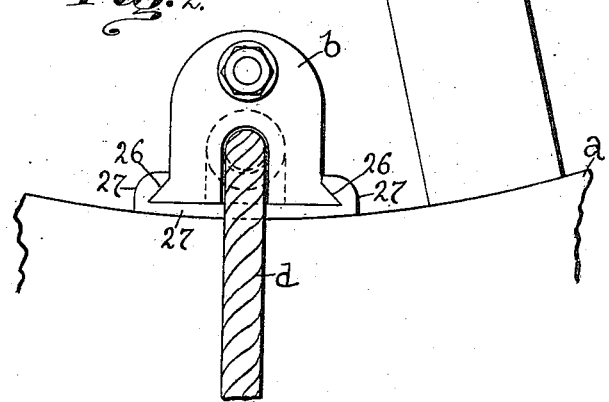
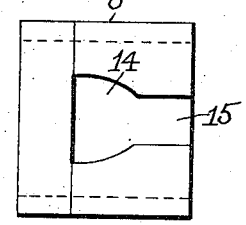
Inventor
George H. Martin
by Jas. H. Churchill
Atty.

UNITED STATES PATENT OFFICE.

GEORGE H. MARTIN, OF NEWTON, MASSACHUSETTS, ASSIGNOR OF ONE-HALF TO FRANKLIN E. HUNTRESS, OF NEWTON, MASSACHUSETTS.

ANTISKID DEVICE.

1,231,181.  Specification of Letters Patent.  Patented June 26, 1917.

Application filed October 17, 1916. Serial No. 126,215.

*To all whom it may concern:*

Be it known that I, GEORGE H. MARTIN, a citizen of the United States, residing in Newton, in the county of Middlesex and State of Massachusetts, have invented an Improvement in Antiskid Devices, of which the following description, in connection with the accompanying drawings, is a specification, like characters on the drawings representing like parts.

This invention relates to an anti-skid device for the wheels of motor vehicles, and especially commercial motor vehicles or trucks.

The invention has for its object to provide a simple, efficient and inexpensive anti-skid device, which is capable of being easily applied by inexperienced operators to the wheel under all conditions and more especially under the severe conditions of winter.

The invention further has for its object to provide an anti-skid device, which is practically free from small parts which are liable to be lost in the snow and mud.

To this end, the device is composed essentially of three members, two of which are connected together to be handled as one piece, and one of which is capable of being adjusted toward and from the other without becoming detached therefrom, and the third member is flexible and adapted to be passed about or around the tire or rim of the wheel and secured in fixed relation thereto by the first mentioned members.

These and other features of this invention will be pointed out in the claims at the end of this specification.

Figure 1 represents in section a motor vehicle wheel provided with an anti-skid device embodying this invention.

Fig. 2, a side elevation of a portion of the wheel and the device shown in Fig. 1, and Fig. 3, a detail of one of the rigid members shown in Fig. 1.

Referring to the drawings, *a* represents one form or construction of wheel used on motor vehicles, and in the present instance, the wheel *a* is represented as of a construction now commonly employed on trucks or commercial motor vehicles.

The wheel *a* has attached to it an anti-skid device embodying this invention and comprising a rigid members *b*, *c*, secured to the felly 10 of the wheel on its inner side, and a flexible member *d*, which is passed around or about the periphery or tread portion of the wheel to make contact with the ground.

The flexible member *d* is preferably made as a piece of wire cable, rope and the like, and is provided at its free ends with heads or enlargements 12, 13, which may be formed thereon in any suitable manner, and which are preferably made as metal buttons, which are brazed, welded or otherwise firmly secured to the ends of the cable or flexible member. The flexible member *d* is detachably secured to the rim of the wheel by the rigid members *b*, *c*, and for this purpose, the rigid members *b*, *c*, are provided with recesses or sockets 14 for the reception of the buttons or heads 12, 13, and with slots 15, which extend from said sockets to the outer side 16 of said rigid members. The slots 15 and sockets 14 extend to the under side or bottom surface of the rigid members, and said sockets are made sufficiently large to receive the heads or buttons and allow the cable to pass through the slots 15, which latter are narrower than the sockets and the heads or buttons, so as to prevent the latter from passing out through the slots 15 when strain is placed upon the cable or flexible member *d*.

The rigid members *b*, *c*, are designed to be connected together so as to be adjustable one with relation to the other and so as to enable them to be assembled together and handled as one piece when they are removed from the wheel.

To this end, one member as *b* has extended through it a bolt 18 having an enlarged threaded portion 19, which is extended through a screw-threaded opening 20 in the rigid member *c*. The bolt 18 is designed to be permanently attached to the member *b*, which may be effected by the enlarged portion 19 engaging the inner side of the said member, and by a nut 21 on the end of the bolt, which projects beyond the outer side or face of the member *b*, which nut is permanently secured to the bolt by a pin 22 or otherwise, the said pin being shown in Fig. 1 as extended through the enlarged rear portion of the nut.

The member *c* is capable of being adjusted toward and from the member *b* by turning the threaded portion 19 in the threaded opening 20 in the member c, and the latter may be locked on the bolt by a cotter pin 24 or other suitable device.

The members b, c are preferably dovetailed at their bottoms to enter dove-tailed guideways 26 in a plate 27 (see Fig. 2), which is fastened to the inner side of the felly or rim 10 of the wheel by suitable means, herein shown as screws 30, but which may be any other desired means such as bolts.

The dove-tailed guideways 26 may be upwardly inclined as herein shown, and the bottoms of the members b, c, may be correspondingly inclined.

In Fig. 1, I have represented the antiskid device in its operative relation to the wheel, and to illustrate the manner in which the flexible member may be readily applied to the wheel and secured in its operative position, I shall assume that the flexible member, herein shown as in its operative condition, has worn through or parted, and it is desired to replace it with a new flexible member d.

In this case, the operator takes out the cotter pin 24 and then turns the bolt 18 in the proper direction to move the member c on the threaded portion 19 of the bolt out of its guideway. The member b is then withdrawn from its guideway. The buttons 12, 13, on the ends of the broken cable are then removed from their sockets, and the buttons on the ends of a new cable are then inserted in the sockets in the members b, c. The member b is inserted in its guideway, the cable is passed about the tread of the wheel and the member c is entered into its guideway, and the bolt 18 is turned to catch the thread in the opening 20 in the member c, after which the bolt is continued to be turned until the two members are brought into position to close the slots in their bottom surfaces by the guide plate 27, and when the members b, c, have been properly positioned, the cotter pin 24 is replaced. The bolt 18 may be turned by a brace wrench or other suitable tool. The members b, c, may be limited in their movement toward each other by contact with each other or by providing a suitable stop on the guide plate 27.

In the present instance, the guide plate 27 is provided with a central portion, which forms shoulders 33, which may be engaged by the buttons 12, 13, to limit the movement of the members b, c, toward each other.

It will be observed that the device comprises essentially three movable members or parts, to wit: the rigid members b, c, and the flexible member d, and that these parts are large and can be readily handled in cold weather by the operator with heavy gloves on his hands. Also these members are of such size that they are not liable to be lost if dropped in the snow or mud, and further they can be assembled together and taken off by inexperienced operators.

I have herein shown one construction embodying the invention, which I may prefer, but it is not desired to limit the invention to the particular construction shown.

Claims:

1. The combination with a wheel of a vehicle, of a guide plate attached to the inner surface of its felly, rigid members supported by said guide plate and movable toward and from each other, a bolt carried by one of said members to rotate thereon and having a threaded portion in engagement with a threaded opening in the other of said members, said members having sockets extended from their under sides, a flexible member passed about the tread of said wheel and having buttons on its free ends located in said sockets.

2. The combination with a wheel of a vehicle, of a guide plate attached to the inner surface of its felly, rigid members movable on said guide plate toward and from each other and transversely with relation to the felly of the wheel, means for moving said members on said guide plate, and a flexible member passed about the tread of the wheel and having its free ends operatively secured to said rigid members.

3. An anti-skid device for vehicle wheels, comprising a guide plate capable of being located on the inner circumference of the felly of a wheel and secured in fixed relation thereto, rigid members supported by said guide plate within the inner circumference of said wheel, and one of which is movable with relation to the other transversely of the wheel and provided with a threaded opening, a bolt having a threaded portion in engagement with said threaded opening and mounted to turn in the other of said rigid members, and a flexible member capable of being passed about the tread of the said wheel and with which said movable rigid member coöperates.

4. An anti-skid device for vehicle wheels comprising rigid members provided with sockets and with slots extended from said sockets to the outer surfaces of said members, a flexible member having enlarged free ends extended into the sockets in said rigid members and having a portion extended through said slots to the outside of said rigid members, and means for adjustably connecting said rigid members together.

5. An anti-skid device for vehicle wheels comprising rigid members provided with sockets and with slots extended from said sockets to the outer surfaces of said members, a flexible member having enlarged free ends extended into the sockets in said rigid members and having a portion extended through said slots to the outside of said rigid members, and a bolt carried by one of said rigid members to rotate therein and having a threaded portion in engagement with a threaded opening in the other of said rigid members.

6. In an anti-skid device for vehicle wheels, a guide plate capable of being located on the inner circumference of the felly of a wheel and secured in fixed relation thereto, a movable rigid member supported by said plate and movable thereon transversely of said felly, a rotatable device having a threaded portion in engagement with said movable rigid member, and a member carried by said plate and in which said threaded device is mounted to turn.

In testimony whereof, I have signed my name to this specification.

GEORGE H. MARTIN.